Patented July 31, 1934

1,968,459

UNITED STATES PATENT OFFICE 1,968,459

RUBBER-LIKE DISPERSION AND METHOD OF PRODUCING SAME

Harold L. Levin, Rutherford, N. J., assignor, by mesne assignments, to The Patent and Licensing Corporation, New York, N. Y., a corporation of Massachusetts No Drawing. Application August 27, 1931, Serial No. 559,700

5 Claims. (Cl. 134—17)

This invention relates to improvements in the art of making aqueous dispersions of rubber or rubber-like material.

One method of dispersing rubber in water heretofore employed contemplates an operation in which plasticized rubber is milled with a colloid until the colloid is substantially incorporated in the rubber, after which the milled plastic mass of rubber containing the colloid is worked in a kneading machine with gradual additions of water until a change of phase occurs, to bring the water into the external phase and the rubber into the internal phase of the system. Another method generally well known contemplates the production of artificial dispersions of rubber by working a plastic or plasticized mass of rubber in an aqueous paste of a colloid under such conditions as to maintain the rubber continually in the internal phase of the system during the dispersing operation. This type of operation possesses certain advantages over the one previously referred to, wherein the rubber mass is, for a substantial time during the dispersing operation, maintained as a coherent continuous phase, in that much less power is expended in effecting complete dispersion of the rubber in water. By continually maintaining the aqueous colloidal paste in the external phase, the plasticized rubber becomes dispersed by the kneading or shearing action of the masticating machine and the continued trituration of the rubber thereby, so that power is required only for the purpose of shearing and circulating the mass in the mixer and repeatedly bringing the rubber into the path or zone of action of the blades of the mixing machine, rather than for the purpose of continually stretching and pulling the tough rubber mass until change of phase occurs.

My present invention is concerned with improvements in a rubber dispersing operation of the type wherein the rubber is dispersed in an aqueous paste of an attriting agent under conditions such that the rubber is maintained continually in the internal or disperse phase of the system during the operation. The invention moreover is particularly concerned with improvements in an operation of this type wherein finely divided mineral material is employed in the form of an aqueous paste in the dispersing operation, whereby to subdivide the plasticized rubber mass by trituration.

I have found that improved results may be obtained by carrying out the process in what may be considered a two-stage operation. In the first stage, the plasticized rubber is worked in a kneading machine into an aqueous paste of the attriting agent until the rubber has been mechanically dispersed into particles of the desired order of fineness. In the second stage, the thickened mass of dispersed particles so obtained is diluted with a water solution or suspension of a peptizing agent. An advantage of operating according to the process of my present invention for dispersion of rubber resides in the fact that the rubber can be satisfactorily and quickly caused to become dispersed into particles of exceedingly fine size. Where the attriting agent is of comparatively low colloidality or where a colloidal attriting agent is employed in relatively low ratios as compared with the quantity of rubber dispersed thereby, any attempt made to dilute the thick mass of dispersed rubber causes the dispersed particles to form agglomerates or strongly adherent groupings of particles. I have found, however, that if the thick mass of dispersed rubber is diluted with a suspension or solution of a substance having a peptizing effect, that the thickened mass may be readily diluted without formation of agglomerates or coarse particles during the diluting operation, with the result that the diluted mass contains exceedingly finely divided particles peptized in the aqueous phase to provide a latex-like product having a particle size of 1–5 mu. Inasmuch as the inception of the diluting step so reduces the viscosity of the mass that no further trituration or similar mechanical dispersing action can take place, the behavior as above described is rather anomalous. In any event, the unexpected results of the operation afford numerous attending advantages, chief of which is the reduction in time consumed for effecting the desired dispersion of the rubber and the attendant saving in the power consumed for effecting the dispersion. This is probably due to the fact that the mineral or other powder selected for this stage may be of relatively low colloidality and less unctuous and slippery, whereby the effectiveness of the triturating action may be greatly enhanced. There is further obtained a reduction in particle size necessary for certain types of uses while simultaneously maintaining either mineral agents of low colloidality and correspondingly high attriting value or small amounts of highly colloidal materials with correspondingly lower attriting value in the system. The finely divided materials referred to in this application are mineral or organic powders readily wettable by water to form a paste. They range in properties from those which are substantially non-colloidal and function primarily to promote trituration and may be termed "attriting" agents to those which are relatively highly colloidal such as bentonite which function more particularly to produce stable dispersions and are primarily emulsifying agents, although also functioning to a lesser degree to effect trituration.

The substances employed to function as peptizing agents or in any other manner to produce the effects herein described are soaps, starch, sodium salts of sulphonic compounds derived from petroleum, caseinates and water soluble gums such as "industrial gum", which either furnish colloid for the system or serve to drive the colloidal material already present into the interface of the dispersed particles.

It is my theory that while materials of both types, in suitable quantities, function to produce rubber dispersions, yet, either sufficient colloidal material must be present to be adsorbed on the rubber particles to prevent partial coalescence on dilution; or else a peptizing agent must be added in lieu of such original colloidal content, which peptizing agent brings about the adsorption of the necessary colloidal particles on the dispersed rubber and thus supplies the interfacial protection. In any event I do not wish to be bound by this theory but it appears to furnish the best explanation.

In the practice of the invention according to the improved process, dispersions of various types of rubber such as the various grades of crude rubber, reclaimed rubber or of blends of such rubbers with fluxing, softening or plasticizing agents such as mineral rubber, rosin, cumar or the like, may be obtained. Thus, for example, crude rubber may be dispersed by first plasticizing the same on a standard rubber mixing mill or like plasticizing apparatus in the usual way until the mass of rubber assumes a plastic or dough-like condition. The plastic mass may then be subjected to a dispersing action by means of a kneading machine, such as a Werner-Pfleiderer mixer, in the presence of a paste of an agent such as ball clay in water. In lieu of ball clay, whiting or other similar powders of low colloidality, or small quantities of a colloidal mineral such as bentonite, or combinations of such colloidal material with a non-colloidal attriting agent may be employed. These materials which serve as an attriting agent for the rubber are used in suitable quantity to ensure the maintenance of sufficient bulk, and a consistency such that the necessary interfacial trituration of the rubber may be effected while the aqueous paste is maintained as the continuous phase of the mass during the agitating action of the mixer. The mass in the mixer is preferably maintained at a temperature of about 160 to 200° F. during the operation. The attriting agent may be employed in quantities ranging from equal parts by weight of attriting agent and rubber, to ten parts of rubber to one part of the attriting agent.

Without intending to restrict the scope of the invention thereto, one specific example of an operation embodying my invention consists in dispersing 100 parts by weight of pale crepe rubber properly plasticized in an aqueous paste made with 50 parts by weight of ball clay and 50 parts by weight of water. The operation is conducted in a standard form of steam-jacketed Werner-Pfleiderer mixer. The mixer may be provided with a tightly fitting cover or ram to prevent the escape of water in the form of steam to ensure the presence of sufficient water in the paste to maintain it as the continuous phase of the system during the masticating action of the mixer. If necessary, water may be added to maintain the desired consistency such that the aqueous paste at all times constitutes the continuous phase and the paste will be sufficiently thick to ensure continued trituration and subdivision without inversion or agglomeration. By this means the rubber becomes dispersed into particles of exceedingly fine size within approximately ten to twenty minutes of operation of the mixer. This rapid disintegration of the rubber into particles of colloidal size is evidently due to the intense rending action provided by the paste of the attriting agent. During this first stage of the operation, which as above stated, consumes a relatively short period of time, the temperature of the mass is maintained at approximately 180° F. by circulating steam through the jacket of the mixer. During the interval of time in which the rubber is gradually disintegrated into finely divided particles, the original consistency or viscosity of the aqueous paste becomes increasingly thick due to the progressive diminution in size and increase in the number of rubber particles, thus presenting increased surface areas for adsorption of water. This thick, pasty condition of the dispersed mass of rubber requires that it be diluted and considerably thinned before it can be applied to the many uses for which rubber dispersions of this character may be employed. When an attempt is made to dilute this mass with water, however, it is found if an insufficient amount of colloidal material is present, that the finely divided particles of rubber agglomerate to an undesirable extent to form coarse particles. This agglomeration is probably explained by the fact that the attriting agent used, containing insufficient colloidal particles is, in accordance with this process removed in part by the diluting water from, or is insufficiently adsorbed at, the interface between the dispersed particles and the surrounding aqueous phase, thereby decreasing its protective action upon the dispersed particles and permitting agglomeration or quasi-coagulation to take place. I have found, however, that if the diluting water employed for reducing the viscosity of the thick aqueous paste of dispersed rubber contains a peptizing material such as soap, dilution may be successfully effected and agglomeration avoided. In the above example, at the end of approximately ten minutes of operation, when the rubber was completely dispersed into a smooth dough-like mass containing closely packed or adherent finely divided particles, the thick aqueous paste of dispersed rubber was diluted with 200 parts of water containing approximately 4 parts of sodium oleate soap, whereupon the dispersion assumed the appearance and consistency of latex. The beneficial effect of this process may be most clearly noted in the case of a not too highly colloidal clay such as referred to in the preceding example, if the batch after completing the stages of dispersion is divided in half and one portion diluted with water while the other portion is treated in accordance with the present invention. In the former case, particles of about 30 mu average will be obtained while with the latter treatment the average particle size will be about 3 mu. It has also been found that to obtain a given consistency a smaller volume of aqueous peptizing reagent is necessary than when water alone is employed. In other words, by this invention the rubber dispersion may be made of a given consistency with a higher concentration of solids than if water alone is used as the diluent.

While I prefer to carry out the second stage of the operation by diluting the thick completed dispersion with a dilute suspension of soap, I have been able to secure substantially similar results by forming the soap in situ.

For this purpose I may employ oleic acid or rosin as a softening agent for the rubber, by milling it into the rubber prior to dispersion in the aqueous paste of the attriting agent. After completion of the first stage of the operation when the rubber has become dispersed in the paste of the mineral powder which constitutes the continuous phase, the dispersion may be diluted with the required amount of diluting water containing sufficient alkali such as sodium hydroxide, to saponify the fatty acid or rosin, and produce a peptizing soap in situ, which functions as above described to prevent the formation of agglomerates during the diluting step. Thus, 100 parts by weight of rubber may be broken down on a rubber mixing mill to the required plastic condition, approximately 5 to 8 parts by weight of oleic acid or rosin or a combination of the two being incorporated in the rubber during the milling operation. The plasticized rubber carrying the saponifiable material is then dispersed in an aqueous paste composed of 4–6 parts by weight of bentonite and 10–30 parts of whiting with 40–100 parts of water and the resulting dispersion may then be diluted with from 100 to 400 parts by weight of water containing 1 part by weight of sodium hydroxide.

In lieu of an aqueous soap solution per se or a soap formed in situ in the completed dispersion, as above described, I have found that substantially the same results may be secured by employing a product such as tri-sodium phosphate, triethanolamine or similar peptizing agents, dissolved in the water employed for diluting the thickened dispersion.

While I have referred specifically to the use of a clay as an agent in effecting dispersion of the rubber, it is to be understood that other substances which act as attriting agents may be substituted therefor. Thus, I have been able to effect a dispersion of the rubber with an aqueous paste of whiting, barytes, aluminium flake (aluminium silicate) etc., the finished dispersion being then diluted in the second stage of the operation as above set forth.

After the dispersion has been diluted, compounding ingredients including fillers, vulcanizing agents and vulcanization accelerators may be added thereto, and likewise preservatives may be incorporated. Thus, in the example above given, 5 parts by weight of zinc oxide, 3 parts by weight of sulphur and 1 part by weight of a well known commercial form of ultra-accelerator were added to the finished dispersion after dilution.

The dispersions produced in accordance with my present invention exhibit marked superiority over rubber dispersions made by the use of soap as the dispersing agent in that they possess a much greater physical and chemical stability towards electrolytes which normally coagulate soap-type dispersions of rubber. Thus the dispersion will be stable to 5% additions of $$\frac{N}{2}$$

sulphuric acid. These dispersions may be used for any of the numerous purposes to which rubber dispersions in general are applicable, and I have found them particularly adaptable for use as a back coating for fibrous rugs or pile fabrics wherein the dispersion is applied to the back of a foundation fabric through which fibres extend in order to serve, when the water is removed from the coating, as an anchor for locking the fibres to the foundation fabric. Likewise I have found the dispersions produced by my invention suitable for use in the production of doubler cloth, sealing compositions, proof cloth, molded objects, etc.

They may also be employed in the manufacture of waterproof paper by incorporating the dispersion with fibrous pulp of any desired character, after which a precipitating or fixing agent such as alum may be added to the mixture of pulp and dispersion and the mass sheeted on any form of standard paper making machine for the production of sheets or boards useful for various purposes, the sheet being heated and pressed to effect coalescence and vulcanization of the rubber upon the fibres.

I claim as my invention:

1. A process of making an aqueous dispersion of rubber which comprises subjecting plasticized rubber to a masticating action in the presence of a relatively stiff aqueous paste of a finely divided powder capable of acting as an attriting agent while maintaining said paste as the continuous phase, continuing the mastication until the plasticized rubber becomes dispersed into finely divided particles, and diluting the dispersion thus formed with water containing a peptizing material.

2. A process of making an aqueous dispersion of rubber which comprises subjecting plasticized rubber to a masticating action in the presence of a relatively stiff aqueous paste of a mineral powder capable of acting as an attriting agent while maintaining said paste as the continuous phase, continuing the mastication until the plasticized rubber becomes dispersed into finely divided particles, and diluting the dispersion thus formed with water containing a peptizing material.

3. A process of making an aqueous dispersion of rubber which comprises subjecting plasticized rubber to a masticating action in the presence of a relatively stiff aqueous paste of a finely divided powder of low colloidality capable of acting as an attriting agent, while maintaining said paste as the continuous phase, continuing the mastication until the plasticized rubber becomes dispersed into finely divided particles, and diluting the dispersion thus formed with water containing a peptizing material, whereby to prevent particle agglomeration during dilution.

4. A process of making an aqueous dispersion of rubber which comprises subjecting plasticized rubber to a masticating action in the presence of a relatively stiff aqueous paste of a mineral powder capable of acting as an attriting agent while maintaining said paste as the continuous phase, continuing the mastication until the plasticized rubber becomes dispersed into finely divided particles, and diluting the dispersion thus formed with water containing soap.

5. A process of making an aqueous dispersion of rubber which comprises subjecting plasticized rubber containing a saponifiable softening agent to a masticating action in the presence of a relatively stiff paste of a finely divided powder capable of acting as an attriting agent while maintaining said paste as the continuous phase, continuing the mastication until the plasticized rubber becomes dispersed into finely divided particles, and diluting the dispersion thus formed with water containing an alkali to react with said softening agent and form a peptizing material in situ.

HAROLD L. LEVIN.